United States Patent
Schuchardt

(10) Patent No.: US 6,875,830 B2
(45) Date of Patent: Apr. 5, 2005

(54) CHELATING PYRIMIDINES AS LIGANDS FOR SINGLE-SITE OLEFIN POLYMERIZATION CATALYSTS

(75) Inventor: Jonathan L. Schuchardt, Royersford, PA (US)

(73) Assignee: Equistar Chemicals, LP, Houston, TX (US)

( * ) Notice: Subject to any disclaimer, the term of this patent is extended or adjusted under 35 U.S.C. 154(b) by 463 days.

(21) Appl. No.: 10/176,348

(22) Filed: Jun. 20, 2002

(65) Prior Publication Data

US 2003/0008987 A1 Jan. 9, 2003

Related U.S. Application Data

(62) Division of application No. 09/875,071, filed on Jun. 6, 2001, now Pat. No. 6,489,414.

(51) Int. Cl.$^7$ .................................................. C08F 4/16
(52) U.S. Cl. ........................ 526/172; 526/161; 526/134; 526/348
(58) Field of Search ................................. 526/172, 161

(56) References Cited

U.S. PATENT DOCUMENTS

| | | | |
|---|---|---|---|
| 4,427,802 A | 1/1984 | Moulton et al. | 523/222 |
| 4,752,597 A | 6/1988 | Turner | 502/104 |
| 4,791,180 A | 12/1988 | Turner | 526/160 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,539,124 A | 7/1996 | Etherton et al. | 548/402 |
| 5,554,775 A | 9/1996 | Krishnamurti et al. | 556/7 |
| 5,637,660 A | 6/1997 | Nagy et al. | 526/160 |
| 5,648,440 A | 7/1997 | Sugano et al. | 526/132 |
| 5,902,866 A | 5/1999 | Nagy et al. | 526/133 |
| 6,211,311 B1 | 4/2001 | Wang et al. | 526/131 |
| 6,232,260 B1 | 5/2001 | Nagy et al. | 502/155 |
| 6,333,292 B1 * | 12/2001 | Gibson et al. | 502/167 |

OTHER PUBLICATIONS

Singh, P. P.; Seth, N. J.; Khan, S. A. Inorg. Nucl. Chem. Lett. 1975, 11, 525 (abstract).*
Oberthur et al. Chem. Ber. 1996, 129,1087.*
M. Oberthur et al., *Chem. Ber. 129* (1996) 1087.
R. Kempe et al., *Polimery43* (1998) 96.
Ittel et al., *Chem. Rev. 100* (2000) 1169.
Britovsek et al., *J. Am. Chem. Soc. 121* (1999) 8728.
D. J. Brown, *The Pyrimidines* (1962) Interscience, Chaps. II, VII.

* cited by examiner

*Primary Examiner*—David W. Wu
*Assistant Examiner*—Rip A. Lee
(74) *Attorney, Agent, or Firm*—Jonathan L. Schuchardt

(57) ABSTRACT

A single-site catalyst system useful for polymerizing olefins is disclosed. The catalyst system comprises an optional activator and a complex that incorporates a Group 3 to 10 transition metal and at least one neutral or anionic chelating pyrimidine ligand. The ligands are easy to make, and they are readily incorporated into transition metal complexes, including those based on late transition metals. By modifying the chelating groups and other substituents on the pyrimidine ring, polyolefin makers can increase catalyst activity and control polymer properties.

14 Claims, No Drawings

US 6,875,830 B2

CHELATING PYRIMIDINES AS LIGANDS FOR SINGLE-SITE OLEFIN POLYMERIZATION CATALYSTS

This is a division of application Ser. No. 09/875,071, filed Jun. 6, 2001 now U.S. Pat. No. 6,489,414.

FIELD OF THE INVENTION

The invention relates to catalysts useful for olefin polymerization. In particular, the invention relates to "single-site" catalysts that incorporate one or more chelating ligands derived from pyrimidines.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes incorporate one or more cyclopentadienyl (Cp) or Cp-like anionic ligands such as indenyl, fluorenyl, or the like, that donate pi-electrons to the transition metal. Non-metallocene single-site catalysts have evolved more recently. Some of these include pi-donor heterocyclic ligands that are isolobal to the cyclopentadienide anion, such as boraaryl (see U.S. Pat. No. 5,554,775) or azaborolinyl (U.S. Pat. No. 5,902,866). A different type of non-metallocene single-site catalyst capitalizes on the chelating effect. Two or more sigma-donor atoms coordinate to a transition metal in these complexes. Examples are 8-quinolinoxy or 2-pyridinoxy ligands (see U.S. Pat. No. 5,637,660), the bidentate bisimines of Brookhart (see *Chem. Rev.* 100 (2000) 1169), and the tridentate pyridine bisimines (see *J. Am. Chem. Soc.* 121 (1999) 8728). The bisimines are valuable for use with late transition metals (Groups 8–10).

Interest in late transition metal catalysts for polyolefin manufacture is growing, largely because of their potential for high activity and their ability to tolerate and incorporate polar comonomers. Recently, we described catalysts based on late transition metals and aromatic 1,2-diimine ligands derived from 1,2-diaminobenzenes (see copending application Ser. No. 09/711,364, filed Nov. 10, 2000). While the synthesis of these ligands avoids the need for an α-diketone starting material (used to make Brookhart's complexes), the aromatic 1,2-diimines have some disadvantages. For example, steric crowding may limit yields of the diimines. Moreover, unwanted side reactions, such as the reaction of two amino groups with one mole of aldehyde or ketone to give a benzimidazole in an intramolecular cyclization reaction, are documented (see U.S. Pat. No. 4,427,802, Example 5).

In spite of their versatility, pyrimidines have apparently not been used as ligands for olefin polymerization catalysts. They have been described as antioxidant moieties for polyolefin stabilizers but not as catalyst components. Nonetheless, pyrimidines occur in nature and have been known for more than a century. Moreover, they are easily synthesized with well-known routes and many are commercially available.

There is a continuing need for single-site catalysts that can be prepared inexpensively and in short order from easy-to-handle starting materials and reagents. In particular, there is a need for new ligands that can be used with late transition metal complexes. Ideally, the ligand structure could easily be modified to provide control over catalyst activity and polyolefin properties.

SUMMARY OF THE INVENTION

The invention is a catalyst system useful for polymerizing olefins. The catalyst system comprises an optional activator and an organometallic complex. The complex incorporates a Group 3 to 10 transition metal and at least one neutral or anionic chelating pyrimidine ligand. Chelating pyrimidines are easy to make, and they are readily incorporated into transition metal complexes, including those based on late transition metals. By modifying the chelating groups and other substituents on the pyrimidine ring, polyolefin makers can increase catalyst activity and control polymer properties.

DETAILED DESCRIPTION OF THE INVENTION

Catalyst systems of the invention are "single site" in nature, i.e., they incorporate distinct chemical species rather than mixtures of different species. They are expected to give polyolefins with characteristically narrow molecular weight distributions (Mw/Mn<3) and good, uniform comonomer incorporation.

The catalyst systems include an organometallic complex that contains a Group 3–10 transition metal. "Transition metal" as used herein includes, in addition to the main transition group elements, elements of the lanthanide and actinide series. More preferred complexes include a Group 4 or a Group 8 to 10 transition metal. "Late" transition metal complexes, i.e., those incorporateing a Group 8–10 metal, are particularly preferred.

The organometallic complex includes at least one chelating pyrimidine ligand, which can be neutral or anionic. "Chelating pyrimidines" act as bidentate ligands for transition metals by bonding to them with (1) one nitrogen atom of the pyrimidine ring, and (2) an electron donor atom that is attached to the pyrimidine ring. Preferably, the electron donor atom is attached to the 2-carbon of the pyrimidine, i.e., the only carbon that is attached to both nitrogen atoms of the pyrimidine ring. However, the electron donor atom can also be attached to the pyrimidine ring at either the 4 or 6 position. The pyrimidine ring can be otherwise unsubstituted or it can have additional substitutent groups that do not interfere with transition metal complex formation, activation, or olefin polymerization. For example, the pyrimidine can be further substituted with halide, hydrocarbyl, nitro, alkoxy, or aryloxy groups, or the like.

Many pyrimidines are commercially available. Moreover, many are easy to synthesize from readily available starting materials. One well-known approach is known as the "Principal Synthetic Method" (see D. J. Brown, *The Pyrimidines* (1962) in *The Chemistry of Heterocyclic Compounds* (monograph series), Interscience Publishers, Chapter 2). This method uses tandem inter- and intramolecular condensation reactions to produce the heterocycle. In one typical example, 4,6-dimethyl-2-aminopyrimidine is easily made by reacting acetylacetone and guanidine carbonate under mild, alkaline conditions:

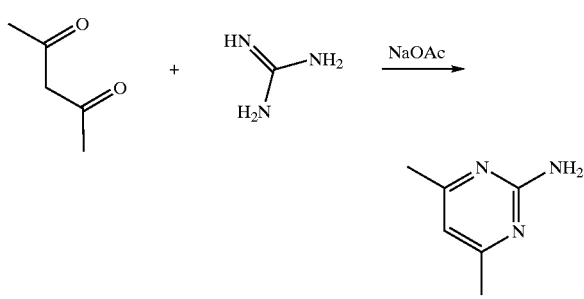

The reaction is remarkably versatile. With guanidine as the amine fragment, we get a 2-aminopyrimidine, but there are many other possibilities. For example, thiourea can be used instead to give a 2-mercaptopyrimidine, while S-methylthiourea gives a 2-(methylthio)-pyrimidine, urea gives a 2-hydroxypyrimidine, and O-methylurea gives a 2-methoxypyrimidine:

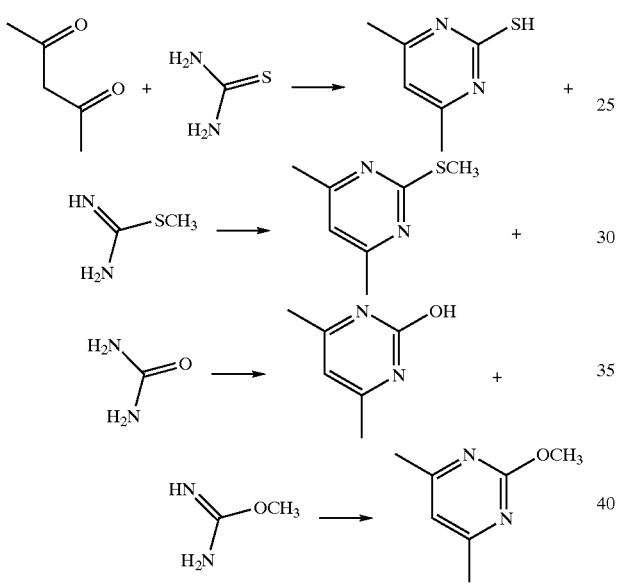

Because either carbonyl group of the three-carbon fragment is also easily varied to aldehyde, ester, or nitrile functionalities, the reaction offers a general approach to a diverse array of pyrimidines, including most of the chelating pyrimidines useful herein. Many other suitable examples are found in Brown, supra.

The chelating pyrimidine ligand can be neutral. In this case, the ligand coordinates to the transition metal through two neutral atoms. Suitable electron donor atoms are oxygen, nitrogen, sulfur, and phosphorus. In a preferred complex, the neutral pyrimidine ligand has the structure:

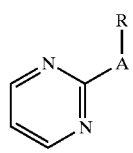

in which A is O, S, NH, or NR'; R is hydrogen or a $C_1$–$C_{30}$ hydrocarbyl group; and R' is a $C_1$–$C_{30}$ hydrocarbyl group. In preferred complexes, the A–R group is alkoxy, thioalkyl, amino, alkylamino, or dialkylamino. Suitable neutral pyrimidine ligands include, for example, 2-amino-pyrimidine, 2-mercaptopyrimidine, 2-methoxypyrimidine, 2-(methylthio)-pyrimidine, 2-(dimethylamino)pyrimidine, 2-hydroxypyrimidine, 2-amino-4-chloropyrimidine, 2-amino-4,6-dimethylpyrimidine, 4,6-dichloro-2-methoxypyrimidine, 2-amino-4,6-dihydroxy-5-nitropyrimidine, and the like.

As noted above, the electron donor atom can be located at the 4 or 6 position of the pyrimidine ring. Accordingly, suitable neutral pyrimidine ligands also include those having the structure:

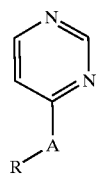

in which A is O, S, NH, or NR'; R is hydrogen or a $C_1$–$C_{30}$ hydrocarbyl group; and R' is a $C_1$–$C_{30}$ hydrocarbyl group. Examples include 4-amino-pyrimidine, 4-mercaptopyrimidine, 4-methoxypyrimidine, 4-(methylthio)-pyrimidine, 4-(dimethylamino)pyrimidine, 4-hydroxypyrimidine, 4-amino-2-chloropyrimidine, 4-amino-2,6-dimethylpyrimidine, 4-amino-2,6-dihydroxypyrimidine, and the like.

The neutral pyrimidine ligand can also be an aldimine or ketimine that is the reaction product of a 2-amino- or 4-aminopyrimidine and an aldehyde or ketone. Preferred ligands in this group have the structure:

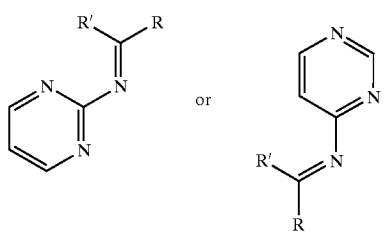

in which R is hydrogen or a $C_1$–$C_{30}$ hydrocarbyl group; and R' is a $C_1$–$C_{30}$ hydrocarbyl group. These ligands chelate to the transition metal through a pyrimidine ring nitrogen and an imine nitrogen atom.

The pyrimidine ligand need not be neutral; it can be anionic. To generate an anionic pyrimidine ligand, an active hydrogen atom is removed from an oxygen, nitrogen, sulfur, or phosphorus atom that is attached to the pyrimidine ring. Preferred anionic pyrimidines have the structure:

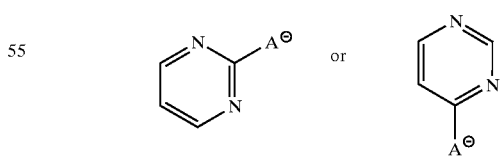

in which A is O, S, or NR, wherein R is hydrogen or a $C_1$–$C_{30}$ hydrocarbyl group. Preferably, A is O or NR, wherein R is hydrogen or a $C_1$–$C_{30}$ alkyl group.

Anionic pyrimidine ligands are made by deprotonating the corresponding aminopyrimidine, hydroxypyrimidine, mercaptopyrimidine, or the like with a potent base according to well-known methods. Suitable bases include, for example, alkyllithium compounds (e.g., methyllithium or n-butyllithium), alkali metals (e.g., sodium metal), alkali metal hydrides (e.g., potassium hydride), and Grignard reagents (e.g., methyl magnesium chloride or phenyl magnesium bromide). Alkyllithium compounds are preferred. These can be made by reacting lithium with an alkyl halide, but more often they are purchased as solutions in a hydrocarbon (e.g., toluene or hexanes) or ether (e.g., diethyl ether or tetrahydrofuran) solvent.

Usually, equimolar amounts of the deprotonating agent and the pyrimidine are used to produce the anionic precursor. Deprotonation can be performed at any suitable temperature, preferably at or below room temperature. While the deprotonation reaction can be performed at temperatures as low as −78° C. or below, it is preferred to perform this step at room temperature.

In addition to the chelating pyrimidine ligand, the organometallic complex may include additional labile or polymerization-stable, anionic ligands. Polymerization-stable ligands include, for example, substituted and unsubstituted cyclopentadienyl, fluorenyl, and indenyl, or the like, such as those described in U.S. Pat. Nos. 4,791,180 and 4,752,597, the teachings of which are incorporated herein by reference. Suitable polymerization-stable ligands include heteroatomic ligands such as boraaryl, pyrrolyl, indolyl, quinolinyl, pyridinyl, azaborolinyl, and indenoindolyl, as described in U.S. Pat. Nos. 5,554,775, 5,539,124, 5,637,660, 5,902,866, and 6,232,260, the teachings of which are incorporated herein by reference. The organometallic complex usually includes one or more labile ligands such as halides, alkyls, alkaryls, aryls, dialkylaminos, or the like. Particularly preferred are halides, alkyls, and alkaryls (e.g., chloride, methyl, benzyl).

The catalyst system optionally includes an activator. Suitable activators help to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)-aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The optimum amount of activator needed relative to the amount of organometallic complex depends on many factors, including the nature of the complex and activator, whether a supported catalyst is used, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 0.1 to about 500 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. However, when a supported catalyst system is used, the activator can be deposited onto the support along with the organometallic complex.

The organometallic complex is prepared according to methods that are well known in the art. In general, the complexes are made by combining the neutral or anionic pyrimidine ligand with a transition metal source. Any convenient source of transition metal can be used. For example, the complexes can be made from transition metal halides, alkyls, alkoxides, acetates, amides, or the like. A particularly convenient source of the transition metal is the transition metal halide. For example, one can use vanadium(III) chloride-tetrahydrofuran complex (VCl$_3$(THF)$_3$), titanium (III) chloride-THF complex, chromium(III) chloride-THF complex, cobalt(II) chloride, nickel(II) bromide, platinum (II) chloride, palladium(II) chloride, lanthanum(III) chloride, titanium(III) acetate, or the like. Complexes can also be prepared from salts with labile groups, such as tetrakis(acetonitrile)palladium(II) bis(tetrafluoroborate).

The transition metal complexes are easy to make. Usually, the is transition metal source (halide, e.g.) is dissolved or suspended in an organic solvent and the neutral or anionic pyrimidine ligand is carefully added. Refluxing is used if needed to complete the reaction. Insoluble by-products, if any, can be removed by filtration, solvents are evaporated, and the transition metal complex is isolated, washed, and dried. The resulting complex can generally be used without further purification.

As noted earlier, some of the organometallic complexes incorporate at least one neutral chelating pyrimidine ligand. Preferred complexes of this type have the structure:

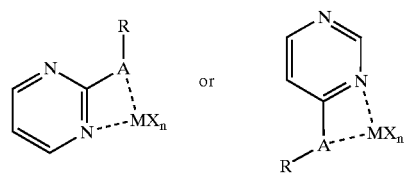

in which M is a Group 3 to 10 transition metal, each X is independently a labile or polymerization-stable ligand, A is O, S, NH, or NR'; R is hydrogen or a C$_1$–C$_{30}$ hydrocarbyl group; and R' is a C$_1$–C$_{30}$ hydrocarbyl group; and n is an integer that satisfies the valence of M.

Other preferred complexes incorporate neutral iminopyrimidine ligands, as exemplified by the structures:

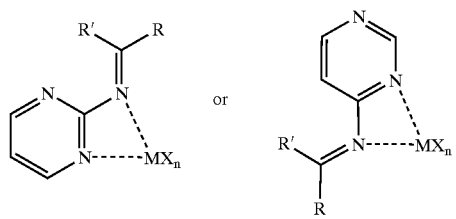

in which M is a Group 3 to 10 transition metal, each X is independently a labile or polymerization-stable ligand; R is hydrogen or a $C_1$–$C_{30}$ hydrocarbyl group; R' is a $C_1$–$C_{30}$ hydrocarbyl group; and n is an integer that satisfies the valence of M.

Preferred complexes from anionic pyrimidine ligands have the structures:

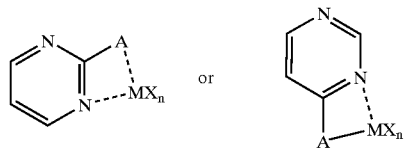

in which M is a Group 3 to 10 transition metal, each X is independently a labile or polymerization-stable ligand, A is O, S, NH, or NR'; R is hydrogen or a $C_1$–$C_{30}$ hydrocarbyl group; and R' is a $C_1$–$C_{30}$ hydrocarbyl group; and n is an integer that satisfies the valence of M.

The catalyst systems are optionally used with an inorganic solid or organic polymer support. Suitable supports include silica, alumina, silica-aluminas, magnesia, titania, clays, zeolites, or the like. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

The complex and optional activator can be deposited on the support in any desired manner. For instance, the components can be dissolved in a solvent, combined with a support, and stripped. Alternatively, an incipient-wetness technique can be used. Moreover, the support can simply be introduced into the reactor separately from the complex and activator.

The loading of complex on the support varies depending upon a number of factors, including the identities of the complex and the support, the type of olefin polymerization process used, the reaction conditions, and other concerns. Usually, the amount of complex used is within the range of about 0.01 to about 10 wt. % of transition metal based on the amount of supported catalyst. A more preferred range is from about 0.1 to about 4 wt. %.

Catalyst systems of the invention are useful for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The olefin polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psig to about 50,000 psig. More preferred is the range from about 15 psig to about 1000 psig.

The following examples merely illustrate the invention. Those skilled in the art will recognize many variations that are within the spirit of the invention and scope of the claims.

Catalyst Preparation

I. From a Neutral Alkoxypyrimidine

Nickel(II) bromide-dimethoxyethane complex (0.88 g, 2.85 mmol) is suspended in THF (15 mL). 2-Methoxy-4,6-dimethylpyrimidine (0.39 g, 2.85 mmol) is added, and the mixture is refluxed for 1.5 h and is filtered. The filtrate is evaporated, and the solids are collected with pentane, filtered, and dried. The expected product is:

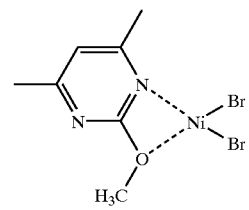

II. From a Neutral Iminopyrimidine

Reaction of equimolar amounts of acetophenone and 2-aminopyrimidine (heated in toluene to reflux with catalytic p-toluenesulfonic acid, and removal of water by azeotropic distillation) gives the desired Schiff-base ketimine product:

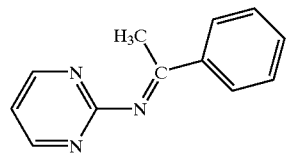

The crude ketimine (0.39 g, 2.0 mmol) is dissolved in diethyl ether (10 mL) and is stirred at room temperature under nitrogen. Nickel(II) bromide-dimethoxyethane complex (0.62 g, 2.0 mmol) is carefully added in small portions to the stirred mixture. The mixture is stirred for 6 h at room temperature, and solvents are removed in vacuo. The expected product is:

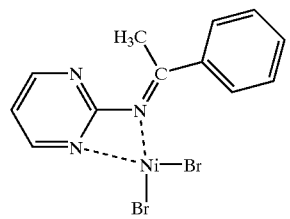

III. From an Anionic Pyrimidine

2-Hydroxy-4,6-dimethylpyrimidine (0.25 g, 2.0 mmol) in tetrahydrofuran (25 mL) is deprotonated by careful addition of n-butyllithium (1.3 mL of 1.6 M solution in hexanes, 2.1 mmol) at −78° C. The resulting anion solution is filtered in vacuo and is added by cannula to a stirred slurry of nickel(II) bromide-dimethoxyethane complex (0.62 g, 2.0 mmol) in THF (15 mL) at 0° C. The mixture is allowed to warm to room temperature, is stirred for an additional 3 h at room temperature, and is filtered. The filtrate is evaporated, and the solids are collected with pentane, filtered, and dried. The expected product is:

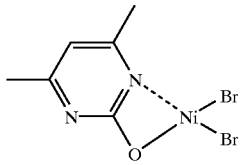

Ethylene Polymerization

Methyl alumoxane (5 mL of 10 wt. % MAO in toluene) is carefully added to a 100-mg sample of the neutral alkoxypyrimidine-nickel complex prepared in (I) above. The mixture is injected into a 1.7 L stainless-steel autoclave containing dry, deoxygenated isobutane (850 mL) and tri-isobutylaluminum (0.2 mmol). The autoclave is heated to 80° C. and is pressurized with ethylene (150 psi). After 1 h, the autoclave is cooled, isobutane is flashed off, and polyethylene, the expected product, is isolated.

The preceding examples are meant only as illustrations. The following claims define the invention.

I claim:

1. A process which comprises polymerizing an olefin in the presence of a catalyst system which comprises an activator and an organometallic complex which comprises a Group 3 to 10 transition metal and at least one neutral, chelating pyrimidine ligand having a structure selected from the group consisting of:

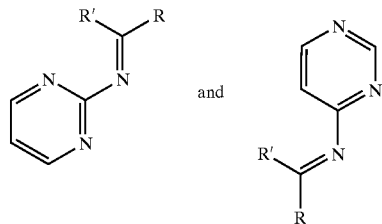

in which R is hydrogen or a $C_1-C_{30}$ hydrocarbyl group; and R' is a $C_1-C_{30}$ hydrocarbyl group.

2. The process of claim 1 wherein the olefin is ethylene or a mixture of ethylene and an α-olefin.

3. The process of claim 1 wherein the activator is an alumoxane, an aluminoboronate, or an ionic borate or aluminate.

4. The process of claim 1 wherein the organometallic complex incorporates a Group 8–10 transition metal.

5. The process of claim 1 wherein the organometallic complex incorporates a Group 4 transition metal.

6. The process of claim 1 wherein the organometallic complex has a structure selected from the group consisting of:

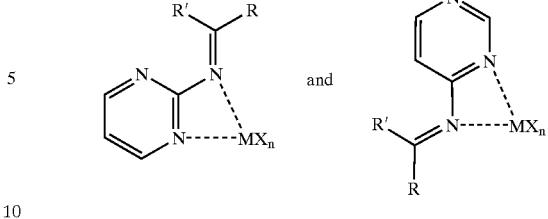

in which M is a Group 3 to 10 transition metal, each X is independently a labile or polymerization-stable ligand; and n is an integer that satisfies the valence of M.

7. The process of claim 1 wherein the catalyst system is supported.

8. A process which comprises polymerizing an olefin in the presence of a catalyst system comprising an activator and an organometallic complex which comprises a Group 3 to 10 transition metal and at least one anionic, chelating pyrimidine ligand having a structure selected from the group consisting of:

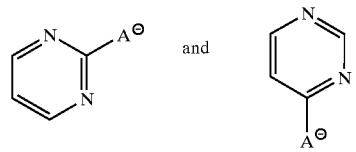

in which A is O, S, or NR, wherein R is hydrogen or a $C_1-C_{30}$ hydrocarbyl group.

9. The process of claim 8 wherein the olefin is ethylene or a mixture of ethylene and an α-olefin.

10. The process of claim 8 wherein the activator is an alumoxane, an aluminoboronate, or an ionic borate or aluminate.

11. The process of claim 8 wherein the organometallic complex incorporates a Group 8–10 transition metal.

12. The process of claim 8 wherein the organometallic complex incorporates a Group 4 transition metal.

13. The process of claim 8 wherein the organometallic complex has the a structure selected from the group consisting of

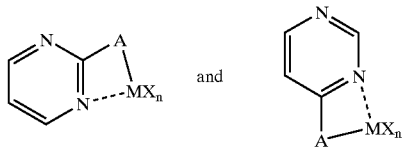

in which M is a Group 3 to 10 transition metal; each X is independently a labile or polymerization-stable ligand; and n is an integer that satisfies the valence of M.

14. The process of claim 8 wherein the catalyst system is supported.

* * * * *